United States Patent [19]

Smith

[11] 3,991,929

[45] Nov. 16, 1976

[54] COATING AND BONDING OF METALS

[75] Inventor: Frank Smith, Runcorn, England

[73] Assignee: Imperial Chemical Industries Limited, London, England

[22] Filed: Sept. 10, 1973

[21] Appl. No.: 395,595

[30] Foreign Application Priority Data

Sept. 22, 1972 United Kingdom............... 43897/72

[52] U.S. Cl............................... 228/208; 228/238; 228/262; 228/263
[51] Int. Cl.$^2$................... B23K 31/02; B23K 35/24
[58] Field of Search............... 29/473.3, 474.4, 502, 29/503, 504; 117/DIG. 8; 29/503; 228/1, 208, 238, 262, 263

[56] References Cited
UNITED STATES PATENTS

| | | | |
|---|---|---|---|
| 2,397,400 | 3/1946 | Barwich............................ | 29/502 |
| 2,555,001 | 5/1951 | Ohl.................................... | 29/504 X |
| 2,798,843 | 7/1957 | Slomin et al.................... | 29/502 UX |
| 2,895,845 | 7/1959 | Jones et al...................... | 117/131 X |
| 2,982,019 | 5/1961 | Drummond...................... | 29/502 X |
| 3,025,596 | 3/1962 | Ward et al....................... | 29/474.4 X |
| 3,213,532 | 10/1965 | Glaser et al..................... | 228/208 X |
| 3,730,761 | 5/1973 | Smith............................... | 29/503 X |
| 3,744,121 | 7/1973 | Nogoro et al................... | 29/504 X |
| 3,760,481 | 9/1973 | Greever........................... | 29/503 X |
| 3,820,232 | 6/1974 | Brevar............................. | 29/479 X |

FOREIGN PATENTS OR APPLICATIONS 1,236,997  6/1971  United Kingdom

OTHER PUBLICATIONS

*Soldering Manual,* prepared by AWS Committee on Brazing and Soldering, copyright 1959, pp. 12–15, 85–90, 121–130.
"Sonosolder–Ultrasonic Fluxless Soldering", publication by Sonobond Corporation, Bulletin SB–8, pp. 1 and 5, 5/59.

*Primary Examiner*—Ronald J. Shore
*Attorney, Agent, or Firm*—Cushman, Darby & Cushman

[57] ABSTRACT

The inside of a sheath of titanium, zirconium or tantalum (or an alloy of one of said metals) is coated with a tinning metal or alloy by heating the sheath while the inside of the sheath is covered with the molten tinning metal, and moving an ultrasonically excited probe over substantially the whole of the outer surface of the sheath, said probe being in contact with the outer surface of the sheath. The coated sheath is then bonded as by soldering to a metal article such as copper or aluminum.

19 Claims, No Drawings

COATING AND BONDING OF METALS

This invention relates to a method of coating the inside of a sheath of titanium, zirconium or tantalum (or an alloy of one of the said metals) with a "tinning" metal or alloy and to a method of bonding the coated sheath to another metal, especially but not exclusively another metal of greater electrical conductivity than titanium, zirconium or tantalum, or alloys thereof.

The invention finds particular application in the production of a composite comprising a sheath of titanium, zirconium or tantalum (or an alloy thereof) bonded to an internal copper conductor.

The presence of an oxide layer on the surface of the sheath of titanium, zirconium or tantalum prevents the surface from being readily wetted by a tinning metal or alloy, and thus these metals are not easily soldered to other metals. It is usually necessary to pre-clean the surface to remove the oxide, for example by pickling in a strong acid. The pre-cleaned titanium, zirconium or tantalum may then be bonded to another metal, by, for example, electroplating with copper or electroless plating with nickel, followed by soldering in a known manner.

In the specification of our UK Pat. No. 1,236,997 there is described and claimed a method of coating a sheet, as opposed to a sheath, of titanium, zirconium or tantalum (or an alloy of one of the said metals) with a tinning metal or alloy which avoids the necessity of precleaning the surface to be coated. The aforesaid method comprises heating the said sheet whilst the surface to be coated is covered with the tinning metal of alloy in the molten state and moving an ultrasonically excited probe over substantially the whole of the surface to be coated, the said probe being in contact with the said surface and with the molten metal or alloy. We have now surprisingly found that a sheath of titanium, zirconium or tantalum (or an alloy thereof) may be coated on its inner surface with a tinning metal without having to move the ultrasonically excited probe over substantially the whole of the surface to be coated whilst being in contact with both the inner surface and the molten tinning metal.

Thus according to one aspect of the present invention there is provided a method of coating the inner surface of a sheath of titanium, zirconium or tantalum (or an alloy of one of the said metals) with a tinning metal or alloy which comprises heating the said sheath whilst the inner surface is covered with the tinning metal or alloy in the molten state and moving an ultrasonically excited probe over substantially the whole of the outer surface of the sheath, the said probe being in contact with said outer surface. Preferably, the ultrasonically excited probe conforms in shape to part or all of said outer surface.

By the term tinning metal or alloy we mean a metal or alloy which will form a coating on the titanium, zirconium or tantalum (or an alloy of one of the said metals) and which will enable the coated titanium, zirconium or tantalum (or alloy thereof) thus obtained to be used in a conventional soldering process.

By the term "sheath" we mean an article akin to a tube as distinct from the planar sheet referred to in our UK Pat. No. 1,236,997. The coated sheath thus obtained may then be bonded to another metal, preferably an electrically conducting metal by a conventional process of soldering.

Thus according to another aspect of the present invention there is provided a method of making a composite by bonding a sheath of titanium, zirconium or tantalum (or an alloy of one of the said metals) to another metal, preferably a metal of greater electrical conductivity than titanium, tantalum or zirconium (or an alloy thereof), which comprises the steps of
i. coating the inner surface of the sheath of titanium, zirconium or tantalum (or an alloy of one of the said metals) with a tinning metal or alloy by the method hereinbefore defined and
ii. soldering the coated sheath thus obtained to the other metal.

The sheath of titanium, zirconium or tantalum (or an alloy thereof) may, for example, have a square, rectangular or triangular cross-section, but it is preferred to use sheaths having a circular cross-section.

The preferred electrically conducting metal is copper, although other electrically conducting metals may be bonded to the coated titanium, zirconium or tantalum or their alloys, for example aluminium.

It is preferred to use tin itself as the tinning metal. A wide range of tinning alloys may be used. Suitable tinning alloys include binary alloys containing a major proportion of tin and a minor proportion of bismuth, cadmium or zinc; binary alloys containing a major proportion of bismuth and a minor proportion of cadmium, lead, tin or zinc; binary alloys containing a major proportion of cadmium and a minor proportion of bismuth or zinc; and binary alloys containing a major proportion of zinc and a minor proportion of bismuth, cadmium, lead or tin. Other suitable alloys include ternary tin-containing alloys including minor proportions of zinc and lead. It is preferred to use a tin/zinc alloy, especially a tin/zinc alloy containing a minor proportion of zinc.

The electrically conducting metal is preferably pretinned before being bonded to the titanium, zirconium or tantalum or their alloys. This may be carried out in the conventional manner by heating the surface to be bonded with an alloy of tin and lead, for example an alloy containing 70% by weight of tin and 30% by weight of lead. Alternatively, an alloy of lead and bismuth or other suitable solder may be used.

A wide range of alloys may be used for soldering the coated sheath of titanium, zirconium or tantalum (or an alloy thereof) to the electrically conducting metal; suitable soldering alloys include, for example, alloys of tin and lead and alloys of lead and bismuth. It is especially advantageous to use alloys of lead and bismuth containing more than 50% by weight of bismuth, for example 55% bismuth, since these alloys expand on cooling thereby strengthening the bond.

When the coating process described herein is applied to an alloy of titanium the alloy may be, in particular, an alloy having polarisation properties comparable with those of titanium. Examples of such alloys include titanium/zirconium alloys containing up to 14% by weight of zirconium, alloys of titanium with up to 5% by weight of a platinum group metal and alloys of titanium with niobium or tantalum containing up to 10% by weight of the alloying constituent.

By a "platinum group metal" is meant one of the metals platinum, rhodium, iridium, ruthenium, osmium and palladium.

The temperature at which the sheath of titanium, zirconium or tantalum (or an alloy thereof) may be coated with the tinning metal or alloy may vary over a wide range, but it is generally preferred to use a temperature in the range from 350° C to 450° C, for example from 380° C to 410° C.

In the case when the sheath is a cylindrical tube the head of the ultrasonic probe is concave in shape with a radius of curvature approximately equal to the sheath radius. Otherwise, the ultrasonic probe may be of a conventional design resonating, for example, at a frequency of approximately 20 k/cs.

The coating may conveniently be carried out by enclosing the sheath in a vertical furnace adapted to open into two halves, thereby allowing access of an ultrasonic probe to the outer surface of the sheath. The sheath is stoppered at one end, filled with the tinning metal or alloy and then inserted into the furnace. The sheath and its contents are heated until the tinning metal or alloy is melted and the furnace is then partly opened. The ultrasonic probe is moved up and down the outer surface of the sheath whilst keeping the probe in contact with the surface. At the same time, the sheath is rotated so that substantially the whole of the outer surface of the sheath comes into contact with the probe. The sheath is then removed from the furnace and emptied of metal or alloy.

The bonding of the coated sheath of titanium, zirconium or tantalum or their alloys to another metal, preferably pretinned electrically conducting metal, may conveniently be carried out by inserting a closely fitting rod of the conducting metal into the coated sheath and melting a lead/tin or a lead/bismuth alloy above the rod whilst maintaining the sheath in a vertical position.

The invention is especially advantageous in the production of titanium/copper or titanium/aluminium conductors having a low electrical resistance at the bonded surfaces. The titanium/copper conductors are particularly useful in electrolytic diaphragm cells and chlorate cells; thus one or more titanium/copper conductors may be successfully spot-welded to a titanium anode plate without adversely affecting the electrical properties of the titanium-copper bond.

The invention is illustrated, but not limited, by the following Examples.

EXAMPLE 1

A titanium tube (¾ inch external diameter; 20 gauge thickness) was sealed at one end with a mild steel plug, filled with a tin/zinc alloy (75% tin, 25% zinc) and inserted into a vertical furnace. The furnace comprised two separate halves which were adapted to swing between a fully closed position (thereby completely surrounding the tube) and a partly or fully opened position. The tube and its contents were heated to 400° C with the furnace in its fully closed position. The furnace was then partly opened. An ultrasonically excited probe, consisting of a half wave-length resonant steel probe (having a natural frequency of 20 k/cs) coupled to a magnetostriction transducer, and having a concave head (approximately ⅜ inch radius of curvature), was moved up and down the outer surface of the tube whilst keeping the probe in contact with the surface. At the same time the tube was rotated until substantially the whole of the outer surface of the tube had come into contact with the tube. The tube was then removed from the furnace and the surplus alloy drained from the tube.

The electrically conducting metal for insertion into the coated titanium tube consisted of a copper rod (⅝ inch diameter) which had a slightly increased diameter at one end, and which was also provided with a terminal connection at this end. The copper rod was pre-tinned with a layer of tin/lead alloy (70% tin, 30% lead) at 120° - 130° C.

The pre-tinned copper rod was pushed into the coated titanium tube, the increased diameter of the rod at the terminal and effectively providing a seal. The tube containing the rod was then introduced into the vertical furnace with the terminal at the lower end of the tube, and lead/bismuth alloy (45% lead, 55% bismuth) was introduced into the upper part of the tube. The tube was heated to 150° C and maintained at this temperature for 5 minutes. The tube containing the rod was then taken out of the furnace and allowed to cool.

EXAMPLE 2

The titanium tube was coated with a tin/zinc alloy (75% tin, 25% zinc) using the procedure described in Example 1.

Two copper rods (each ⅝ inch diameter) were pre-tinned with a layer of tin/lead alloy (70% tin/30% lead) at 220° - 230° C.

One of the pre-tinned copper rods was inserted into the tube until it occupied about half the tube. The lead/bismuth alloy (45% lead, 55% bismuth) was introduced into the tube above the copper rod, and the second pre-tinned copper rod pushed into the unoccupied part of the tube. The tube was introduced into the vertical furnace, heated to 150° C and the rods pushed together. The tube containing the rods was maintained at 150° C for 5 minutes and then taken out and allowed to cool.

What we claim is:

1. A method of making a composite by bonding a tube-like sheath of titanium, zirconium or tantalum (or an alloy of one of the said metals) to a copper or aluminum article which comprises the steps of
   i. coating the inner surface of the sheath of titanium, zirconium or tantalum (or an alloy of one of the said metals) with a tinning metal or alloy by heating the said sheath to a temperature in the range 350° C to 450° C while the inner surface is covered with the tinning metal or alloy in the molten state and moving an ultrasonically excited probe over substantially the whole of the outer surface of the sheath, said probe being in contact with said outer surface and
   ii. surrounding the article with the coated sheath thus obtained and soldering together the sheath and the article.

2. A method as claimed in claim 1 wherein said ultrasonically excited probe conforms in shape to part or all of said outer surface of the sheath.

3. A method as claimed in claim 1 wherein the alloy constituting the sheath is an alloy of titanium and zirconium containing up to 14% by weight of zirconium.

4. A method as claimed in claim 1 wherein the alloy constituting the sheath is an alloy of titanium and a platinum group metal containing up to 5% by weight of the platinum group metal.

5. A method as claimed in claim 4 wherein the platinum group metal is selected from the group consisting of platinum, rhodium, iridium, ruthenium, osmium or palladium.

6. A method as claimed in claim 1 wherein the alloy constituting the sheath is an alloy of titanium and niobium or tantalum containing up to 10% by weight of niobium or tantalum.

7. A method as claimed in claim 1 wherein the tinning metal is tin.

8. A method as claimed in claim 1 wherein the tinning alloy is a binary alloy containing a major proportion of tin and a minor proportion of bismuth, cadmium or zinc.

9. A method as claimed in claim 1 wherein the tinning alloy is a binary alloy containing a major proportion of cadmium and a minor proportion of bismuth or zinc.

10. A method as claimed in claim 1 wherein the tinning alloy is a binary alloy containing a major proportion of zinc and a minor proportion of bismuth, cadmium, lead or tin.

11. A method as claimed in claim 1 wherein the tinning alloy is a ternary alloy of tin/zinc/lead containing a major proportion of tin and minor proportions of zinc and lead.

12. A method as claimed in claim 1 wherein the article is pre-tinned with an alloy of tin and lead before being bonded to the coated sheath of titanium, zirconium or tantalum or an alloy of one of said metals.

13. A method as claimed in claim 2 wherein the pre-tinning alloy contains 70% by weight of tin and 30% by weight of lead.

14. A method as claimed in claim 1 wherein the article is pre-tinned with an alloy of lead and bismuth before being bonded to the coated sheath of titanium, zirconium or tantalum or an alloy of one of the said metals.

15. A method as claimed in claim 1 wherein the coated sheath of titanium, zirconium or tantalum (or an alloy thereof) is soldered to the article using as a solder an alloy of tin and lead.

16. A method as claimed in claim 1 wherein the coated sheath of titanium, zirconium or tantalum (or an alloy of one of said metals) is soldered to the article using as a solder an alloy of lead and bismuth.

17. A method as claimed in claim 16 wherein the alloy of lead and bismuth contains more than 50% by weight of bismuth.

18. A method as claimed in claim 17 wherein the alloy of lead and bismuth contains 55% by weight of bismuth and 45% by weight of lead.

19. A method as claimed in claim 1 wherein the temperature of the sheath during coating is in the range of 380° C to 410° C.

* * * * *